(12) United States Patent
Condaminet et al.

(10) Patent No.: US 8,893,503 B2
(45) Date of Patent: Nov. 25, 2014

(54) DEPLOYABLE DIVERGENT NOZZLE FOR A PROPULSIVE UNIT

(75) Inventors: Olivier Condaminet, Gasny (FR); Romain Stephant, Martigues (FR); Philippe James, Vernon (FR)

(73) Assignee: Snecma, Paris (FR)

( * ) Notice: Subject to any disclaimer, the term of this patent is extended or adjusted under 35 U.S.C. 154(b) by 585 days.

(21) Appl. No.: 13/262,501

(22) PCT Filed: Mar. 31, 2010

(86) PCT No.: PCT/FR2010/050601
§ 371 (c)(1),
(2), (4) Date: Dec. 6, 2011

(87) PCT Pub. No.: WO2010/112766
PCT Pub. Date: Oct. 7, 2010

(65) Prior Publication Data
US 2012/0067052 A1    Mar. 22, 2012

(30) Foreign Application Priority Data
Apr. 2, 2009   (FR) ...................................... 09 52138

(51) Int. Cl.
| B63H 11/00 | (2006.01) |
| B63H 11/10 | (2006.01) |
| F02K 1/00 | (2006.01) |
| F02K 9/97 | (2006.01) |

(52) U.S. Cl.
CPC ............. *F02K 9/976* (2013.01); *F05D 2260/96* (2013.01)
USPC ..................... 60/771; 239/265.11; 239/265.19

(58) Field of Classification Search
USPC .............. 60/771; 239/265.11, 265.19, 265.43
See application file for complete search history.

(56) References Cited

U.S. PATENT DOCUMENTS

| 3,711,027 | A | * | 1/1973 | Carey ........................ 239/265.19 |
| 4,162,040 | A | * | 7/1979 | Carey ........................ 239/265.33 |
| 4,213,566 | A | * | 7/1980 | Miltenberger ........... 239/265.43 |
| 4,349,155 | A | * | 9/1982 | Donguy .................... 239/265.33 |
| 4,676,436 | A | * | 6/1987 | Willis ....................... 239/265.33 |
| 5,282,576 | A |   | 2/1994 | Chatenet et al. |
| 7,299,636 | B2 | * | 11/2007 | Roth et al. ...................... 60/771 |
| 7,571,610 | B2 | * | 8/2009 | Kretschmer .................... 60/771 |

FOREIGN PATENT DOCUMENTS

| EP | 0516519 | 12/1992 |
| EP | 0661436 | 7/1995 |
| FR | 2622931 | 5/1989 |
| GB | 2013787 | 8/1979 |

* cited by examiner

*Primary Examiner* — Gerald L Sung
(74) *Attorney, Agent, or Firm* — Preti Flaherty Beliveau & Pachios LLP

(57) ABSTRACT

The present invention relates to a deployable diverging bell (2) for a thruster, the bell comprising:
  a stationary first diverging bell portion (3) suitable for being connected to a stationary support of the thruster (1);
  a movable second diverging bell portion (4) that is movable between a retracted position and a deployed position in which it is connected to the downstream end of the first diverging bell portion (3) in order to extend it (3); and
  at least one deployment mechanism (6, 8) including means (6) for moving the movable second diverging bell portion (4) relative to the stationary first diverging bell portion (3) in order to deploy the movable second diverging bell portion (4) from its retracted position to its deployed position;
  the bell being characterized in that it includes at least one damper means (13) for damping vibration coming from the movable second diverging bell portion (4) and/or the deployment mechanism (6, 8).

13 Claims, 4 Drawing Sheets

DEPLOYABLE DIVERGENT NOZZLE FOR A PROPULSIVE UNIT

The present invention relates to a deployable diverging bell for a rocket thruster.

The thrust from a thruster depends essentially on the flow rate of the ejected gas and on its speed of ejection. In order to optimize the speed of ejection of the gas, it is necessary to have a diverging bell with a large outlet diameter, mainly for a second or third stage of a multistage thruster. This leads to diverging bells that are long, which is often not very compatible with the space available during periods under thrust from the lower stages. One solution consists in designing a deployable diverging bell that presents a short length in its initial configuration and that is capable of being lengthened by putting one or more rings or diverging bell portions into place.

Deployable diverging bells are also used to enable the outlet section of thruster nozzles to be matched to ambient pressure, which pressure diminishes on going from low altitudes close to the ground up to high altitudes, such that optimum thrust continues to be approached as closely as possible in spite of changes in altitude.

Various types of deployment mechanism have been proposed for deployable diverging bells, in particular mechanisms using systems based on cables, on roller screws, on ball screws, on deployable beams, or on a membrane. Thus, the following documents in particular FR 2 457 390, FR 2 677 080, and FR 2 757 571 are known.

Nevertheless, whatever the deployment system or mechanism of the movable diverging bell, during lift-off of the rocket or the like, the movable diverging bell portion in its retracted or initial position is excited dynamically by the engine or the thruster(s).

Thus, the movable diverging bell portion that is secured to the structure as a whole via only a certain number of fastening points can sometime move violently, in particular if it enters into resonance at the excitation frequencies from the engine/thruster(s). This can lead to very high levels of vibration from the movable diverging bell portion, which vibration can be transmitted to the entire structure of the rocket or the like and can give rise to forces that may be fateful, in particular for the mechanism for deploying the movable diverging bell portion or for certain components of the rocket or the like.

At present, the strategy for solving that type of problem consists in mechanically reinforcing components, in particular in the mechanism for deploying the deployable diverging bell.

That solution naturally has a negative impact on the weight of the deployment mechanism and thus on its functional performance. Such mechanical reinforcement also presents a significant additional cost. Finally, that solution does not reliably solve the problem of vibration being transmitted: if the deployment mechanism enters into resonance, then its increased weight makes the dynamic phenomenon worse.

The invention seeks to propose a solution for remedying that vibration problem, or for limiting its effects, which solution is substantially free of the above-mentioned drawbacks of the prior art.

In order to achieve this object of the invention, the invention provides a deployable diverging bell for a thruster, the bell comprising:
 a stationary first diverging bell portion suitable for being connected to a stationary support of the thruster;
 a movable second diverging bell portion that is movable between a retracted position and a deployed position in which it is connected to the downstream end of the first diverging bell portion in order to extend it; and
 at least one deployment mechanism including means for moving the movable second diverging bell portion relative to the stationary first diverging bell portion in order to deploy the movable second diverging bell portion from its retracted position to its deployed position;
 the bell being characterized in that it includes at least one damper means for damping vibration coming from the movable second diverging bell portion and/or the deployment mechanism, and in that the damper means are positioned between the deployment mechanism and the stationary support of the thruster and/or the stationary first diverging bell portion.

Thus, it is by eliminating or significantly damping the vibration coming from the movable diverging bell portion and/or from the deployment mechanism/system for said movable diverging bell portion that the invention achieves its object.

By means of the damper system of the invention, the transmission of vibration/stress is very considerably reduced, by a factor of at least about two, such that it now becomes possible, without mechanical reinforcement, to provide a rocket or the like with a needed movable diverging bell portion that is to take up a deployed position downstream from a stationary diverging bell without running the risk of damaging the structure of the rocket or the like, in particular during lift-off of said rocket or the like.

The particular position of the damper means between firstly the deployment mechanism and secondly the stationary portion (the stationary support of the thruster and/or the stationary first diverging bell portion) makes it possible to damp the vibration effectively while avoiding transmitting vibration to the stationary structure. Such effectiveness would not be achieved with damper means between two movable portions.

Other features or characteristics are set out below.

The deployment mechanism includes at least one fastener assembly for fastening the deployment mechanism of the movable second diverging bell portion.

Advantageously, the fastener assembly includes the damper means.

In an embodiment of the invention, the fastener assembly comprises a plurality of arms and a connection part, said arms being suitable for being fastened firstly to a part that is stationary relative to the stationary diverging bell and being fastened secondly to the connection part.

In particularly advantageous manner, at least one of said arms is suitable for being connected to the stationary support of the thruster and the damping of vibration or the like is particularly effective when the damper means are arranged between the connection part and said arm. The angle between the connection part and the arm connected to the stationary support of the thruster is an acute angle. Similarly, the angle between the damper means and the deployment mechanism and the angle between the damper means and said arm are acute angles.

In an embodiment of the invention, the deployment mechanism comprises means suitable for moving the second diverging bell portion in translation, such as a ball screw.

In an embodiment of the invention, the deployable diverging bell of the invention includes three fastener assemblies distributed uniformly around the circumference of the stationary diverging bell.

Advantageously, the deployment mechanism is controlled by a control unit situated at a distance from said diverging bell.

Other characteristics and advantages of the invention appear better on reading the following description of a preferred embodiment of the invention given by way of non-limiting example. The description refers to the accompanying drawings, in which.

Below, the invention is illustrated in a configuration in which the deployment mechanism of the deployable diverging bell makes use, as means for moving the movable second portion of the diverging bell, of a ball-screw system so as to move the movable second portion of the diverging bell in translation, however it is equally possible to envisage using systems that rely on cables, on rollers screws, on deployable beams, or on a membrane.

Figure 1:
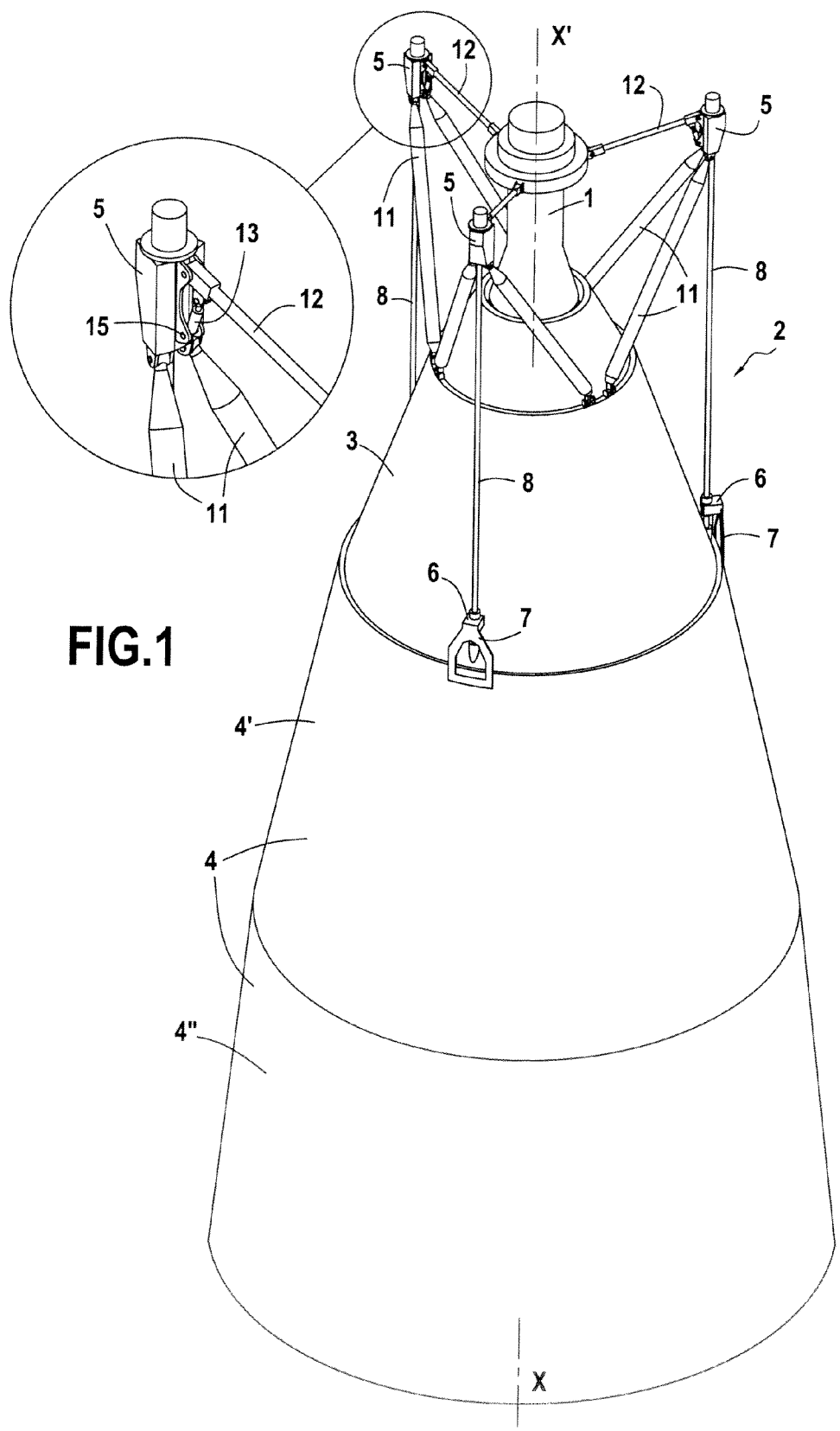
FIG. 1 is a perspective view of a deployable diverging bell of the invention in which the movable second portion of the diverging bell is in the deployed position.
Figure 2:
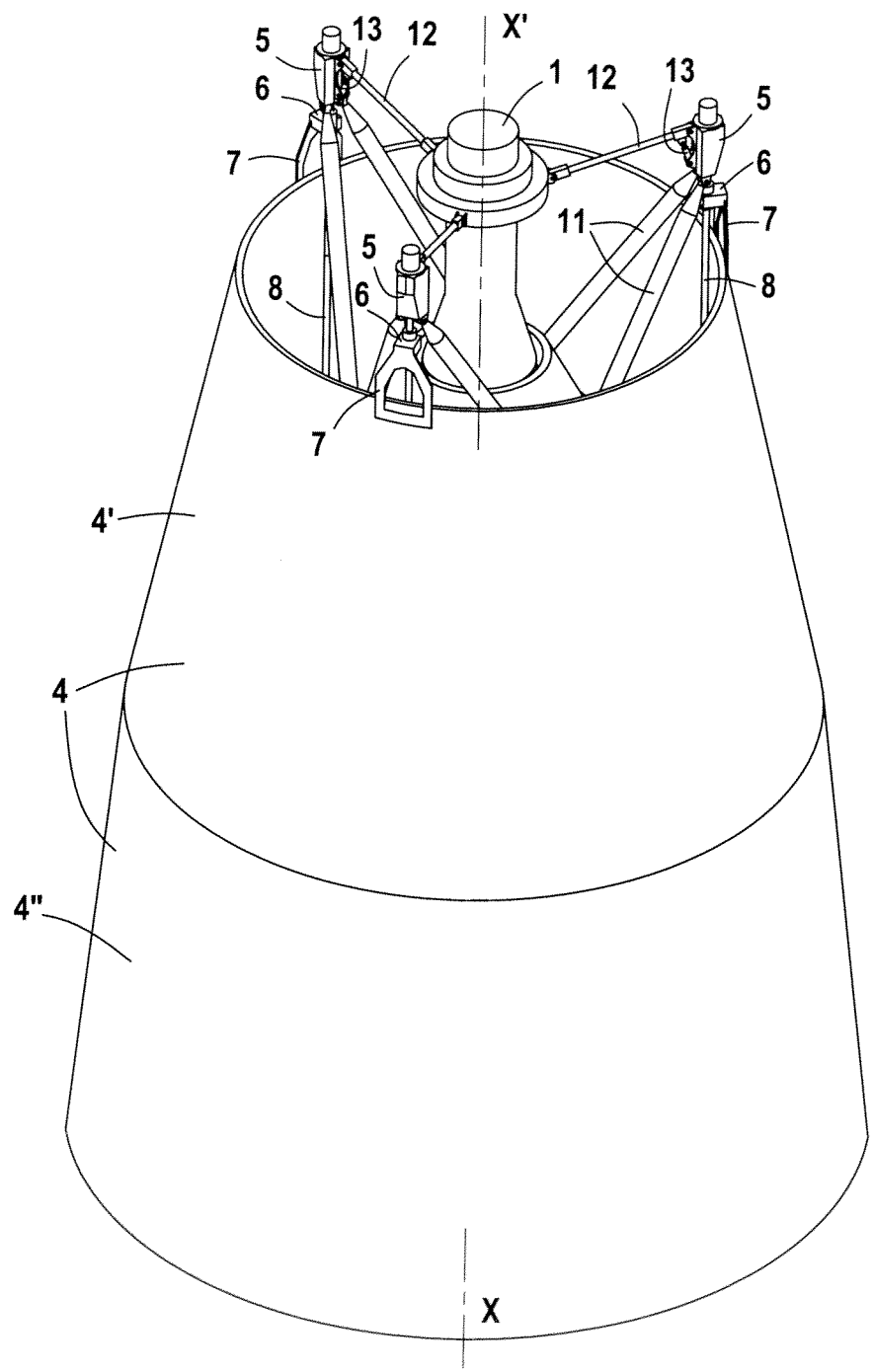
FIG. 2 is a perspective view of the deployable diverging bell of the invention as shown in FIG. 1, with the movable second portion of the diverging bell in the retracted position.

For reasons of simplification, FIG. 1 shows no more than a stationary support for the thruster 1, here a thruster end, and the deployable diverging bell 2 of the invention. The deployable diverging bell 2 of the invention comprises a stationary first diverging bell portion 3 connected to the stationary support of the thruster 1. The connection between the stationary support of the thruster 1 and the stationary diverging bell 3 comprises a rigid fastening, e.g. via a bolted connection or welding. Furthermore, a movable second diverging bell portion 4 is positioned downstream from the stationary diverging bell 3 in the deployed position. These first and second diverging bell portions, the stationary portion 3 or the movable portion 4 are constituted by truncated cones made of metal or composite material and they serve to guide and direct hot gas from combustion in a thruster (not shown in the accompanying figures).

In the example shown to illustrate the invention, the movable second diverging bell portion 4 is itself made up of two fractions 4' and 4", the proximal fraction 4' presenting a flare angle that is greater than that of the end fraction 4". The outlet diameters of the diverging bell portions 3 and 4 increase going along the axis of symmetry X'X. In the example chosen to illustrate the invention, the deployable diverging bell 2 includes three sets of connection parts 5 for holding a deployment mechanism 6, 8 that is constituted in this example by a ball-screw system, each connection part 5 being associated with a rotary part 5'. These connection parts 5 serve to fasten and guide three respective deployment mechanisms 6, 8 for deploying the movable second diverging bell portion 4, and they are themselves fastened to the stationary diverging bell 3 substantially at the downstream end of the stationary diverging bell 3 by means of arms 11, 12 that are described below. Each deployment mechanism 6, 8 is made up of a movable element 6, or ball screw, connected to a portion 7 constituting a movable fitting that is fastened to the movable second diverging bell portion 4 and a threaded rod 8 on which said movable element 6 moves. Thus, the movement of the movable element 6 along the linear axis of the threaded rod 8 drives the movement in translation of the movable second diverging bell portion 4 along an axis parallel to the axis of symmetry X'X. The connection parts 5 are arranged circumferentially around the stationary support of the thruster 1 and between one another they present angles substantially equal to 120°. Naturally, a larger number of connection parts 5 could be provided together with a corresponding number of deployment mechanisms 6, 8 in order to move the movable second diverging bell portion 4. It is advantageous to provide for the connection parts 5 and thus the deployment mechanisms 6, 8 to have a symmetrical arrangement around the stationary support of the thruster 1. Thus, by way of example, if the deployable diverging bell 2 includes four connection parts 5, and thus four deployment mechanisms, then the connection parts 5 should be arranged in a common plane with angles substantially equal to 90° between one another.

Figure 3:
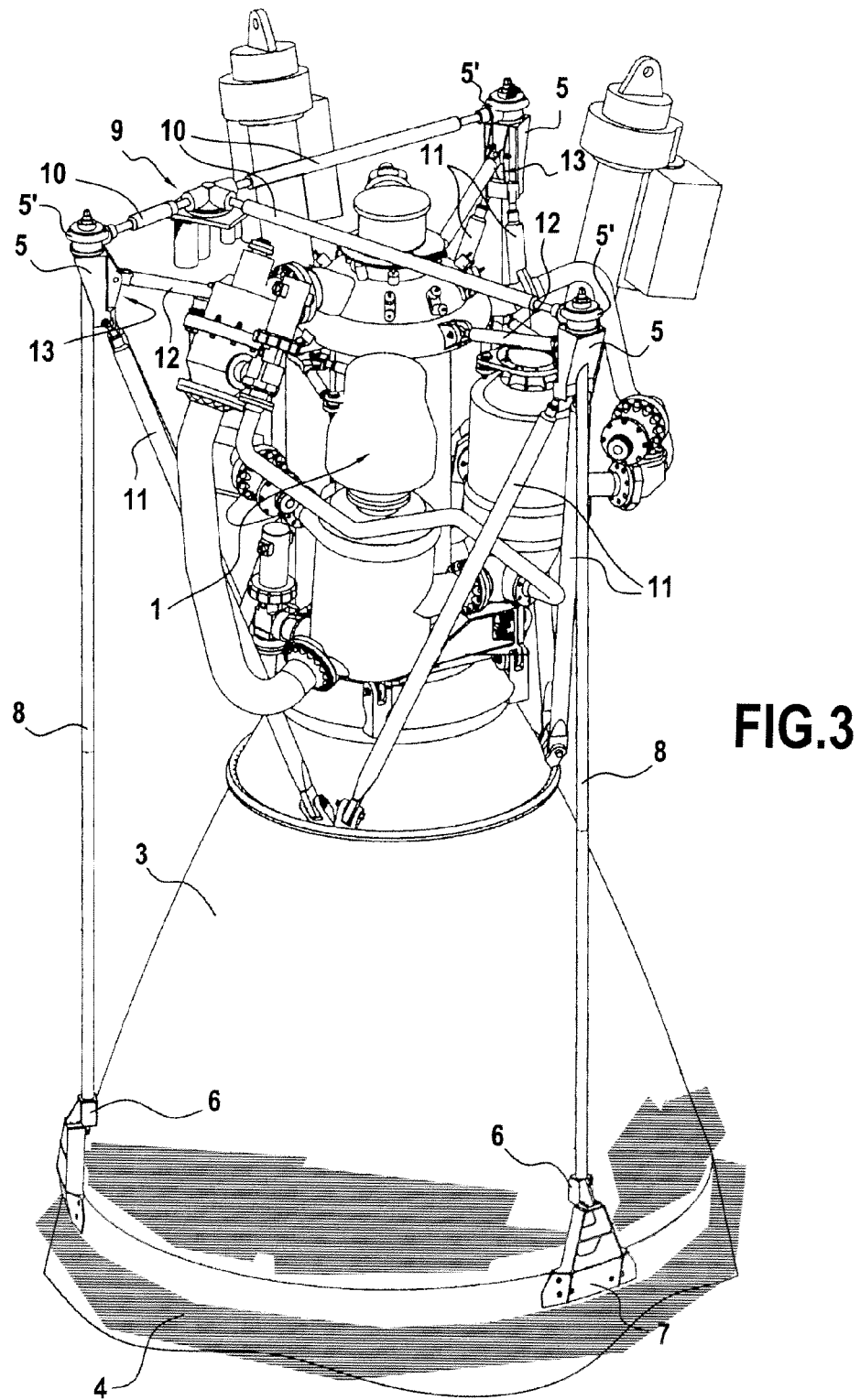
FIG. 3 is a more detailed diagrammatic view of the stationary support zone of the thruster connected to the stationary first portion of the diverging bell.

The deployment mechanisms 6, 8 are actuated by control means 9, preferably situated remotely from the deployable diverging bell 2 of the invention. In this example, the control means 9 are situated in the stationary structure of the thruster 1. The system for driving the deployment mechanisms 6, 8 via the control means 9 may be provided, for example, by rotary transmission shafts 10, as shown in FIG. 3, or by belt systems.

The deployable diverging bell 2 also includes connection arms 11, 12. In the example chosen to illustrate the invention, three stationary connection arms 11, 12 are connected firstly to the top end of the stationary first diverging bell portion 3 or to the stationary support of the thruster 1, and secondly to one of the connection parts 5. For each connection part 5, two connection arms 11 extend from the upstream end (connected to the stationary support of the thruster 1) of the stationary first diverging bell portion 3 to the connection part 5 at identical angles of inclination relative to the axis X'X, with these arms 11 being symmetrical relative to the plane formed by the axis X'X and a threaded rod 8. Ideally, these two connection arms 11 are disposed symmetrically on either side of the connection part 5 or of a plane containing the axis X'X and the linear axis of the threaded rod 8. A third connection arm 12 is mounted on each connection part 5 at an angle of inclination of about 20° to 35° relative to the plane perpendicular to the axis X'X and containing the three connection parts 5, and it extends from the stationary support of the thruster 1 and more precisely from the top end of the stationary support of the thruster 1 to the connection part 5.

As shown in the enlargement of FIG. 1, damper means 13 are arranged between at least one of the connection arms 12 and the connection part 5. In the example chosen to illustrate the invention, respective damper means 13 are mounted on each of the connection parts 5. Furthermore, and preferably, the damper means 13 are mounted between the connection arms 12 that extend substantially horizontally and the connection part 5. As shown in FIG. 4, the positioning of the damper means 13 between the connection part 5 and the arm 12 enables the angle α between the axis along which the threaded rod 8 extends and the axis 14 along which the damper means 13 extend to be an acute angle. Similarly, the angle β between the damper means 13 and the connection arm 12 that extends substantially horizontally is likewise an acute angle.

The damper means 13 may be constituted by one or more springs, a material having elastic properties, a hydraulic, pneumatic, or hydropneumatic damper, a magneto-rheological damper, or any other type of damper suitable for providing a damping function and for being mounted on the diverging bell of the invention.

Figure 4A:
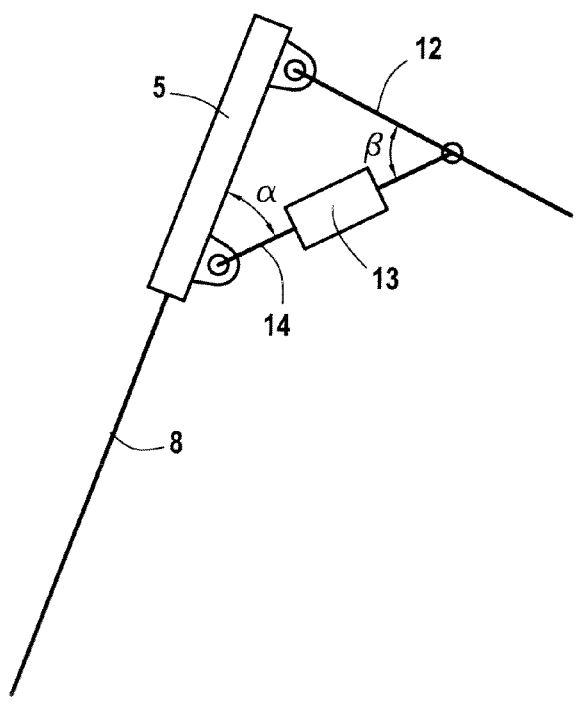
FIGS. 4A and 4B are diagrams illustrating the extreme positions of the movement means and of the fastener assembly during vibration and also the configuration of damper means of the invention.
Figure 4B:
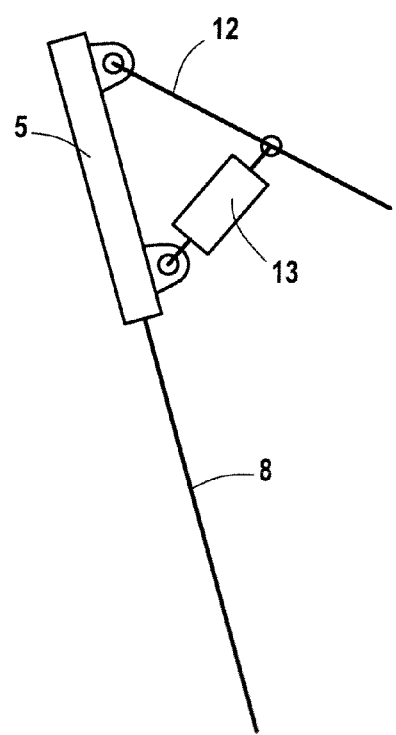

FIGS. 4A and 4B are diagrams showing the arrangement of the damper means 13 between the connection part 5 and the arm 12. These two FIGS. 4A and 4B show diagrammatically the two extreme movement positions that can be generated by vibration of the movable second diverging bell portion 4, of the threaded rod 8, and of the connection part 5 together with the arm 12 relative to one another, 5, 8 relative to 12. The function of the damper means 13 is to dissipate the dynamic response of the structure to the vibration generated by the engine/thruster so as to reduce the movements of the deployment mechanisms 6, 8 and/or of the movable second diverging bell portion 4. By way of example, the initial angle, i.e. the angle at rest, between the arm 12 and the deployment mechanism 6, 8 may be set to 60°, with the damper means 13 serving to reduce variation in the angle between the two elements 6-8 and 12 to a minimum value, e.g. of the order of ±5°. Thus, the vibration of the movable second diverging bell portion 4 is attenuated substantially and is transmitted little or not at all to the stationary support of the thruster 1 and to the rocket or the like. Furthermore, this vibration no longer has a significant effect on the structural integrity of the engine/thruster, in particular of the stationary and movable elements of the nozzle and the stationary and movable elements of the deployment mechanism.

In the absence of the damper means 13, vibration of the movable second diverging bell portion 4 would be transmitted without being attenuated to the end of the thruster 1, i.e. to the rocket or the like, such that the angle between the deployment mechanism 6, 8 and the arms 12 would vary to a much greater extent.

The invention relates firstly to using damper means 13 in a deployable diverging bell 2 constituted by a stationary first diverging bell portion 3 and by a movable second diverging bell portion 4 so that the vibration of the movable diverging bell 4 is not transmitted to the stationary support of the thruster 1 or to the rocket or the like, or is reduced very substantially.

The movable second diverging bell portion 4 is fastened to the stationary support of the thruster 1 and/or to the stationary diverging bell portion 3 via a plurality of support means 5, 11, 12 that are connected to the stationary support of the thruster 1, conventionally the end of the thruster, and/or to the stationary first diverging bell portion 3 via a plurality of fixed arms 11, 12. The vibration of the movable second diverging bell portion 4, in particular during lift-off of the rocket or the like, propagates to the end of the thruster 1, to the stationary first diverging bell portion 3, and to the entire structure of the rocket or the like via said stationary arms 11, 12. The damper means 13 are thus ideally fastened between at least one of the connection parts 5 and at least one of the stationary arms 11, 12 so as to absorb this vibration and thus reduce it considerably.

At least some of the stationary arms 12 connect the movable second diverging bell portion 4 directly to the end of the thruster 1 via the or each stationary arm 12. Thus, advantageously, damper means 13 are placed between each of the connection parts 5 and said stationary arms 12 that are connected to the stationary support of the thruster 1.

As shown in the enlarged portion of FIG. 1, the connection part 5 may include a projecting portion 15 that is slightly offset relative to the linear axis of the deployment mechanism 6, 8 or of the connection part 5 so as to facilitate positioning of the damper means 13.

Provision may also be made for at least one damper means 13 to be located between a connection part 5 and the other stationary arms 11 that are connected to said connection part 5.

Naturally, the invention is not limited to using a single damper means 13 and provision may be made for a plurality of damper means 13 arranged between the connection part 5 and the stationary arms 11, 12 and also between the various stationary arms 11 and 12.

The invention claimed is:

1. A deployable diverging bell for a thruster, the bell comprising a stationary first diverging bell portion suitable for being connected to a stationary support of the thruster; a movable second diverging bell portion that is movable between a refracted position and a deployed position in which said second diverging bell portion is connected to a downstream end of the first diverging bell portion in order to extend said first diverging bell portion; at least one deployment mechanism adapted to move said movable second diverging bell portion relative to said stationary first diverging bell portion in order to deploy said movable second diverging bell portion from the refracted position thereof to the deployed position thereof;
the deployment mechanism comprising:
at least one arm fastened to a part that is stationary relative to the stationary first diverging bell portion and to a connection part; and
at least one rotatable threaded rod fastened to the connection part and to a fitting fastened to the second diverging bell portion;
at least one damper for damping vibration coming from at least one of said movable second diverging bell portion and the deployment mechanism, the damper being positioned between the connection part and said arm.

2. The diverging bell as claimed in claim 1, wherein the arm is fastened firstly to the stationary support of the thruster and secondly to the connection part.

3. The diverging bell as claimed in claim 1, wherein the deployment mechanism is adapted to move the second diverging bell portion in translation.

4. The diverging bell as claimed in claim 1, including three fastener assemblies distributed uniformly around a circumference of the stationary diverging bell.

5. The diverging bell as claimed in claim 1, wherein the deployment mechanism is controlled by a control unit situated at a distance from said diverging bell.

6. A deployable diverging bell for a thruster, the bell comprising:
a stationary first diverging bell portion suitable for being connected to a stationary support of the thruster;
a movable second diverging bell portion that is movable between a refracted position and a deployed position in which said second diverging bell portion is connected to a downstream end of the first diverging bell portion in order to extend said first diverging bell portion;
at least one deployment mechanism adapted to move said movable second diverging bell portion relative to said stationary first diverging bell portion in order to deploy said movable second diverging bell portion from the refracted position thereof to the deployed position thereof;
at least one damper for damping vibration coming from at least one of said movable second diverging bell portion and the deployment mechanism, the damper being positioned between the deployment mechanism and at least one of a stationary support of the thruster and the stationary first diverging bell portion;
wherein:
the deployment mechanism includes:
at least one fastener assembly for fastening the deployment mechanism of the movable second diverging bell portion,
the fastener assembly comprising a plurality of arms and a connection part, said arms being suitable for being fastened firstly to the stationary support of the thruster and being fastened secondly to the connection part, and wherein the angle between said arm and the connection part is an acute angle.

7. The diverging bell as claimed in claim 6, wherein the damper is included in the fastener assembly.

8. The diverging bell as claimed in claim 6, wherein the deployment mechanism comprises a ball screw.

9. The diverging bell as claimed in claim 6, wherein the arm is fastened firstly to the stationary support of the thruster and secondly to the connection part.

10. A deployable diverging bell for a thruster, the bell comprising:
   a stationary first diverging bell portion suitable for being connected to a stationary support of the thruster;
   a movable second diverging bell portion that is movable between a refracted position and a deployed position in which said second diverging bell portion is connected to a downstream end of the first diverging bell portion in order to extend said first diverging bell portion;
   at least one deployment mechanism adapted to move said movable second diverging bell portion relative to said stationary first diverging bell portion in order to deploy said movable second diverging bell portion from the refracted position thereof to the deployed position thereof;
   at least one damper for damping vibration coming from at least one of said movable second diverging bell portion and the deployment mechanism, the damper being positioned between the deployment mechanism and at least one of a stationary support of the thruster and the stationary first diverging bell portion;
   the deployment mechanism including at least one fastener assembly for fastening the deployment mechanism of the movable second diverging bell portion;
   the fastener assembly comprising a plurality of arms and a connection part, said arms being suitable for being fastened firstly to the stationary support of the thruster and being fastened secondly to the connection part, and wherein the angle between the damper and the deployment mechanism and the angle between the damper and said arm are acute angles.

11. The diverging bell as claimed in claim 10, wherein the arm is fastened firstly to the stationary support of the thruster and secondly to the connection part.

12. The diverging bell as claimed in claim 10, wherein the deployment mechanism comprises a ball screw.

13. The diverging bell as claimed in claim 10, wherein the damper is included in the fastener assembly.

* * * * *